(12) United States Patent
Tirkkonen et al.

(10) Patent No.: US 10,979,981 B2
(45) Date of Patent: Apr. 13, 2021

(54) APPARATUS, METHOD AND COMPUTER PROGRAM PRODUCT PROVIDING COMMON PILOT CHANNEL FOR SOFT FREQUENCY REUSE

(75) Inventors: Olav Tirkkonen, Helsinki (FI); Mika P. Rinne, Espoo (FI); Klaus Hugl, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 2174 days.

(21) Appl. No.: 11/544,498

(22) Filed: Oct. 6, 2006

(65) Prior Publication Data
US 2007/0082692 A1 Apr. 12, 2007

Related U.S. Application Data

(60) Provisional application No. 60/724,572, filed on Oct. 7, 2005.

(51) Int. Cl.
| H04L 5/00 | (2006.01) |
| H04L 25/02 | (2006.01) |
| H04W 52/16 | (2009.01) |
| H04L 27/26 | (2006.01) |
| H04W 52/32 | (2009.01) |

(52) U.S. Cl.
CPC .......... H04W 52/16 (2013.01); H04L 5/005 (2013.01); H04L 5/0023 (2013.01); H04L 25/0226 (2013.01); H04L 27/261 (2013.01); H04W 52/325 (2013.01); H04L 5/0064 (2013.01); H04L 25/0204 (2013.01)

(58) Field of Classification Search
USPC .......................... 375/146, 260, 147, 267, 285
See application file for complete search history.

(56) References Cited

U.S. PATENT DOCUMENTS

| 6,259,685 B1* | 7/2001 | Rinne et al. ................... 370/330 |
| 6,545,997 B1* | 4/2003 | Bohnke ................... H04L 5/023 370/203 |
| 6,839,326 B1* | 1/2005 | Pajukoski et al. ............ 370/252 |

(Continued)

FOREIGN PATENT DOCUMENTS

| CN | 1254223 A | 5/2000 |
| EP | 1 542 488 A1 | 6/2005 |

(Continued)

OTHER PUBLICATIONS

Common Pilot Channel http://en.wikipedia.org/wiki/Common_pilotchannel, Feb. 2007.*

(Continued)

Primary Examiner — Jaison Joseph
(74) Attorney, Agent, or Firm — Harrington & Smith

(57) ABSTRACT

A method for operating a wireless communication system in a cell includes allocating a first plurality of pilot resources to a first frequency sub-band comprising a plurality of high power sub-carriers, allocating a second plurality of pilot resources to a second frequency sub-band comprising a plurality of low power sub-carriers, signaling a power offset between the plurality of pilot resources in the plurality of high power sub-carriers and the plurality of pilot resources in the plurality of low power sub-carriers, and transmitting the first and the second plurality of pilot resources over the first and the second frequency sub-bands.

40 Claims, 6 Drawing Sheets

(56) References Cited

U.S. PATENT DOCUMENTS

| | | | | |
|---|---|---|---|---|
| 7,031,739 | B1 | 4/2006 | Imura | 455/522 |
| 7,245,601 | B2* | 7/2007 | Jeschke et al. | 370/335 |
| 7,386,030 | B2* | 6/2008 | Asghar et al. | 375/142 |
| 7,457,588 | B2* | 11/2008 | Love et al. | 455/67.11 |
| 7,558,230 | B2* | 7/2009 | Lee et al. | 370/318 |
| 2003/0108013 | A1* | 6/2003 | Hwang et al. | 370/335 |
| 2003/0128673 | A1* | 7/2003 | Lee et al. | 370/318 |
| 2004/0131110 | A1* | 7/2004 | Alard et al. | 375/149 |
| 2004/0136342 | A1* | 7/2004 | Pedersen | H04W 28/16 370/335 |
| 2005/0135324 | A1 | 6/2005 | Kim et al. | 370/343 |
| 2005/0181816 | A1* | 8/2005 | Han et al. | 455/522 |
| 2006/0146948 | A1* | 7/2006 | Park et al. | 375/260 |
| 2007/0047569 | A1* | 3/2007 | Das et al. | 370/443 |
| 2007/0060062 | A1* | 3/2007 | Wengerter et al. | 455/63.2 |
| 2007/0147328 | A1* | 6/2007 | Carlsson et al. | 370/342 |

FOREIGN PATENT DOCUMENTS

| | | |
|---|---|---|
| JP | 2005-005781 | 1/2005 |
| WO | WO-99/53629 A2 | 10/1999 |
| WO | WO-03/096707 A2 | 11/2003 |

OTHER PUBLICATIONS

3rd Generation Partnership Project; Technical Specification Group Radio Access Network; Physical channels and mapping of transport channels onto physical channels (FDD) (Release 5) 2002.*

"Pilot Power Allocaton for OFDM Systems", by Jiming Chen et al., Vehicular Technology Conference 2003, VTC 2003—Spring. The 57$^{th}$ IEEE Semiannual, vol. 2, Iss., Apr. 22-25, 2003; pp. 1283-1287 vol. 2.

3GPP TR 25.913, 3$^{rd}$ Generation Partnership Project; Technical Specification Group Radio Access Network; Requirements for Evolved UTRA (E-UTRA) and Evolved UTRAN (E-UTRAN) (Release 7).

"Soft Frequency Reuse Scheme for UTRAN LTE" Huawei, 3GPP TSG RAN WG1 Meeting #41, Athens, Greece, May 9-13, 2005, R1-050507.

"Interference Coordination in New OFDM DL Air Interface", R1-050407, Alcatel 3GPPS TSG RAN WG1 #41, Athens Greece May 9-13, 2005.

"Inter-Cell Interference Handling for E-UTRA", Ericsson, R1-050764, TSG-RAN WG1 #42, London UK Aug. 29-Sep. 2, 2005.

"Flarion FLEXband" concept, Signals Ahead, vol. 2, No. 3, Feb. 7, 2005 Michael W. Thelander.

3$^{rd}$ Generation Partnership Project: Technical Specification Group Radio Access Network; Physical layer aspects for evolved Universal Terrestrial Radio Access (UTRA) (Release 7), 3GPP TR 25.814 V7.0.0 (Jun. 2006).

"A New Path-Gain/Delay-Spread Propagation Model for Digial Cellular Channels", Larry Greenstein et al., IEEE Transactions on Vehicular Technology, vol. 46, No. 2, May 1997, pp. 477-485.

Signals Ahead, vol. 2, No. 16, Aug. 31, 2005, p. 5.

Signals Flash, Aug. 11, 2005 pp. 1-3.

Signal Ahead, vol. 1, No. 3, May 10, 2004.

Motorola: *Pilot Power Ratio Signaling (Corrected)*, 3GPP Draft; R1-1-1087 (LLR_EST), 3$^{rd}$ Generation Partnership Project (3GPP), Mobile Competence Centre; 650, Route Des Lucioles; F-06921 Sophia-Antipolis Cedex; France, vol. RAN WG1, No. Sophia Antipolis, France; Jan. 28, 2002, Jan. 28, 2002 (Jan. 28, 2002, XP050111099, [retrieved on Jan. 28, 2002].

* cited by examiner

|  | a) | b) | c) | d) | e) | f) | g) | h) | i) | j) | k) |
|---|---|---|---|---|---|---|---|---|---|---|---|
| SR BAND | 4 | 3 | 5 | 2 | 3 | 6 | 6 | 9 | 9 | 10 | 10 |
| SR BAND (kHz) | 60 | 45 | 75 | 30 | 45 | 90 | 90 | 135 | 135 | 150 | 150 |
| PILOTS/NUSED | 1/3 | 1/2 | 4/15 | 1/3 | 2/9 | 1/9 | 2/9 | 1/9 | 5/27 | 1/6 | 1/5 |
| HIGHPOWPILOTS/PILOTS | 1/2 | 1/2 | 1/2 | 1 | 1 | 1 | 1/2 | 1 | 3/5 | 3/5 | 2/3 |

PROPERTIES OF EXAMPLE PILOT ARRANGEMENTS

FIG.3

CELL TYPE 1
 CELL TYPE 2
 CELL TYPE 3

APPARATUS, METHOD AND COMPUTER PROGRAM PRODUCT PROVIDING COMMON PILOT CHANNEL FOR SOFT FREQUENCY REUSE

CROSS-REFERENCES TO RELATED APPLICATIONS

This application claims the benefit of U.S. Provisional Application No. 60/724,572, filed Oct. 7, 2005.

TECHNICAL FIELD

The exemplary and non-limiting embodiments of this invention relate generally to wireless cellular communications systems and devices and, more specifically, relate to those wireless cellular communications systems that employ pilot channels transmitted to a receiver.

BACKGROUND

The following abbreviations are herewith defined.
3GPP third generation partnership project
UTRAN universal terrestrial radio access network
E-UTRAN evolved UTRAN
CDM code division multiplex
DL down link (Node B to UE)
UL up link (UE to Node B)
DSP digital signal processors
FDM frequency division multiplex
Node B base station
OFDM orthogonal frequency division multiplex
SR sub-band soft reuse sub-band
TDM time division multiplex
UE user equipment
WCDMA wideband code division multiple access
WCDMA LTE WCDMA long term evolution Inter-cell interference is a serious problem that needs to be addressed during the design of a multi-cellular communication system. Conventional systems reduce the amount of interference of geographically adjacent cells by allocating their carrier frequencies to different center frequencies, separated by the bandwidth of the carrier. Thus, there is a reuse factor, which determines tiers of geographical cells such that base stations transmitting on the same center frequency are much further away than the geographically closest neighbors. This approach is known to complicate network planning, since when introducing a new base station the operator is required to update of the frequency plan of all the base stations in that area. Modern systems, such as WCDMA, are designed so that frequency reuse planning is not needed at all, i.e., full coverage network can be deployed by applying the same frequency in all the geographical cells. This is also necessary as the system bandwidth is so large, 5 MHz for WCDMA. Thus, it would not be efficient to deploy such a wideband system with frequency reuse. WCDMA, as any modern signal structure, is designed so that frequency reuse 1 deployment is possible, practical and efficient. This same requirement has been set for E-UTRAN. The system bandwidth of E-UTRAN is scalable from values ranging from 1.25 MHz up to 20 MHz, and possibly even higher (e.g., up to 100 MHz).

E-UTRAN will be designed so that downlink transmission is a multi-carrier signal, where a mathematical transform is applied to form sub-carriers, each of which carry modulated symbols. Such a block of sub-carrier symbols is referred to as an OFDM symbol, if the transforms applied are DFT or FFT transforms. Other types of multi-carrier compositions exist by other mathematical transforms as sine or cosine transforms, lapped transforms, bi-orthogonal transforms, isotropic transforms, etc. In the UL, the E-UTRAN may be a similar multi-carrier signal as well, but is preferably a single carrier signal characterized by a frequency division multiplex of users (SC-FDMA). In any of the aforementioned techniques, the frequency reuse 1 technique is feasible.

One potential solution to the inter-cell interference problem employs a so-called soft reuse method (in time/frequency). In a soft reuse method, different orthogonal transmission resources are given different transmission powers, and the power usage is planned in the cellular system on a cell-by-cell basis. While time domain soft reuse may be applied to any multiplexing technology, frequency domain soft reuse requires the presence of a multi-carrier system or a like SC-FDMA system in order to be applicable.

While soft reuse has been considered in the time domain and in the frequency domain, a frequency domain arrangement is more advantageous in an asynchronous communication system. It has been stressed in the requirements for WCDMA LTE that the E-UTRAN should be operable in an asynchronous fashion (see, for example, 3GPP TR 25.913, "3rd Generation Partnership Project; Technical Specification Group Radio Access Network; Requirements for Evolved UTRA (E-UTRA) and Evolved UTRAN (E-UTRAN); (Release 7)). As such, a frequency domain soft reuse implementation will likely be a strong candidate for a LTE system architecture. Such has been suggested in 3GPP by Huawei (Soft frequency reuse scheme for UTRAN LTE, R1-050507, Athens meeting, May 2005). Reference may also be made to Alcatel, Interference coordination in new OFDM DL air interface, R1-050407, Athens meeting, May 2005, and to Ericsson, Inter-cell interference handling for E-UTRA, R1-050764, August 2005. Note also the "Flarion FLEXband" concept (Signals Ahead, Vol 2, no 3, February 2005.).

Further, the concept of soft reuse is well described in the commonly assigned U.S. Pat. No. 6,259,685 B1, "Method for Channel Allocation Utilizing Power Restrictions", Mika Rinne, Mikko Rinne and Oscar Salonaho. Also of interest in this field is 3GPP TR 25.814, "3rd Generation Partnership Project; Technical Specification Group Radio Access Network; Physical Layer Aspects for Evolved UTRA (Release 7)".

SUMMARY

The foregoing and other problems are overcome, and other advantages are realized, in accordance with the exemplary embodiments of these teachings.

In accordance with an exemplary embodiment of the invention, a method includes allocating a first plurality of pilot resources to a first frequency sub-band comprising a plurality of high power sub-carriers, allocating a second plurality of pilot resources to a second frequency sub-band comprising a plurality of low power sub-carriers, signaling a power offset between the plurality of pilot resources in the plurality of high power sub-carriers and the plurality of pilot resources in the plurality of low power sub-carriers, and transmitting the first and the second plurality of pilot resources over the first and the second frequency sub-bands.

In accordance with another exemplary embodiment of the invention, a program of machine-readable instructions, tangibly embodied on an information bearing medium and executable by a digital data processor, to perform actions including allocating a first plurality of pilot resources to a first frequency sub-band comprising a plurality of high power sub-carriers, allocating a second plurality of pilot resources to a second frequency sub-band comprising a plurality of low power sub-carriers, signaling a power offset between the plurality of pilot resources in the plurality of high power sub-carriers and the plurality of pilot resources in the plurality of low power sub-carriers, and transmitting the first and the second plurality of pilot resources over the first and the second frequency sub-bands in a cell.

In accordance with another exemplary embodiment of the invention, a network element includes a transmitter, a processor coupled to the transmitter, and a memory coupled to the processor for storing a set of instructions, executable by the processor, for allocating a first plurality of pilot resources to a first frequency sub-band comprising a plurality of high power sub-carriers, allocating a second plurality of pilot resources to a second frequency sub-band comprising a plurality of low power sub-carriers, signaling a power offset between the plurality of pilot resources in the plurality of high power sub-carriers and the plurality of pilot resources in the plurality of low power sub-carriers, and transmitting the first and the second plurality of pilot resources over the first and the second frequency sub-bands in a cell.

In accordance with another exemplary embodiment of the invention, a user equipment includes a receiver, a processor coupled to the receiver, and a memory coupled to the processor for storing a set of instructions, executable by the processor, for receiving a power offset between a plurality of pilot resources in the plurality of high power sub-carriers and a plurality of pilot resources in the plurality of low power sub-carriers, using the power offset to receive a first plurality of pilot resources allocated to a first frequency sub-band comprising the plurality of high power sub-carriers, and using the power offset to receive a second plurality of pilot resources allocated to a second frequency sub-band comprising the plurality of low power sub-carriers.

In accordance with another exemplary embodiment of the invention, an integrated circuit includes a first circuitry operable to allocate a first plurality of pilot resources to a first frequency sub-band comprising a plurality of high power sub-carriers and to allocate a second plurality of pilot resources to a second frequency sub-band comprising a plurality of low power sub-carriers, a second circuit operable to transmit a power offset between the plurality of pilot resources in the plurality of high power sub-carriers and the plurality of pilot resources in the plurality of low power sub-carriers, and a third circuitry operable to transmit the first and the second plurality of pilot resources over the first and the second frequency sub-bands in a cell.

In accordance with another exemplary embodiment of the invention, an integrated circuit includes a first circuitry operable to receive pilot resources from a first frequency sub-band comprising a plurality of high power sub-carriers and to receive a second plurality of pilot resources from a second frequency sub-band comprising a plurality of low power sub-carriers, and a second circuit operable to receive a power offset between said plurality of pilot resources in the high power sub-carriers and said plurality of pilot resources in the low power sub-carriers.

In accordance with another exemplary embodiment of the invention, a network element including an element for allocating a first plurality of pilot resources to a first frequency sub-band comprising a plurality of high power sub-carriers, an element for allocating a second plurality of pilot resources to a second frequency sub-band comprising a plurality of low power sub-carriers, an element for signaling a power offset between the plurality of pilot resources in the plurality of high power sub-carriers and the plurality of pilot resources in the plurality of low power sub-carriers, and element for transmitting the first and the second plurality of pilot resources over the first and the second frequency sub-bands in a cell.

BRIEF DESCRIPTION OF THE DRAWINGS

In the attached Drawing Figures:

FIG. 3 is a Table showing properties of pilot arrangements according to exemplary embodiments of the invention;

DETAILED DESCRIPTION

The exemplary embodiments of this invention pertain generally to multi-cellular, multi-carrier communication systems, such as one known as evolved UTRAN (E-UTRAN) being standardized in the 3GPP. However, the exemplary embodiments of this invention should not be construed as being limited for use with only one particular type of wireless communications system or only one particular type of wireless communications system access technology.

A problem that is addressed and solved by the exemplary embodiments in accordance with this invention relates to the joint design of frequency domain soft reuse and common pilot structures. With joint design, channel estimation performance may be optimized for soft reuse.

Figure 1:
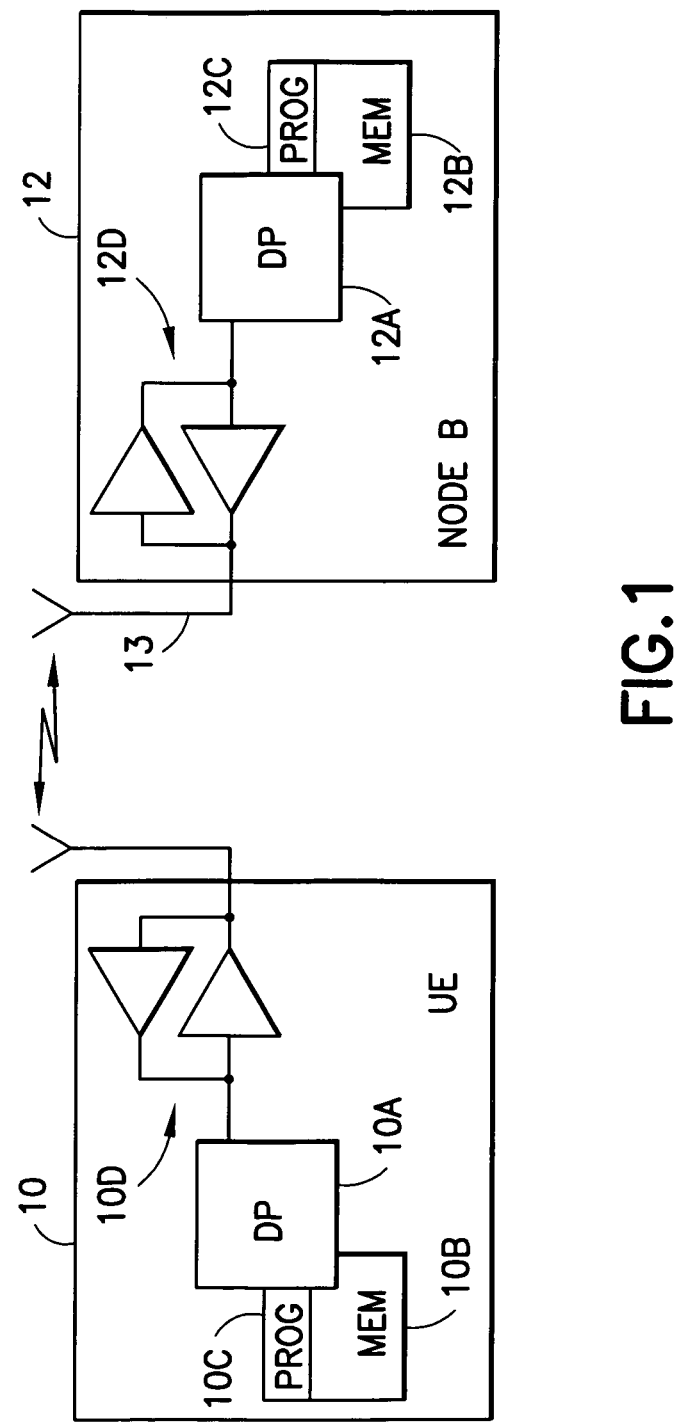
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1, a wireless network 1 includes a UE 10 and a Node B (base station) 12. The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The PROGs 10C and 12C are assumed to include program instructions that, when executed by the associated DP, enable the electronic device to operate in accordance with the exemplary embodiments of this invention, as will be discussed below in greater detail.

Although the Node B 12 is shown having one antenna 13, in practice there may be a plurality of antennas at least for transmitting to the UE 10, as will be discussed below.

In general, the various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor-based memory devices, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

In a frequency domain soft reuse concept, it is assumed that the pilots are transmitted with a power that depends on the power mask that is used in the frequency domain. That is, in those frequency blocks that are associated with a lower power portion of the frequency spectrum in a given cell, the pilots are transmitted with lower power.

However, in accordance with the joint pilot and soft reuse arrangement represented by the exemplary embodiments of this invention, more pilot resources and/or pilot power are allocated to frequency sub-bands with higher transmission power in a manner that does not compromise overall pilot density. This improves the overall channel estimation quality, and furthermore those users that have allocated resources in sub-bands with lower transmission power may enjoy the benefits of higher pilot power, present in nearby high-power frequency sub-bands.

It can be noted that an alternative arrangement of transmitting pilots with higher power in a low power sub-band does not make sense in a soft-reuse scenario. This is true at least for the reason that one motivation to employ soft reuse is to reduce the interference experienced by cell edge users, whereas transmitted pilots cause interference just as do data transmissions. Thus, transmitting the pilots with higher power in low power sub-bands would work against mitigating the interference experienced by the cell edge users.

As employed herein, pilot density is considered to be the density of a given pilot sequence in frequency and/or time. The frequency density of the pilot defines what is the distance in frequency (in number of sub-carriers or in kHz) between the consequent symbols of the pilot sequence. The time density of the pilot defines what is the distance in time (in number of sub-frames, in number of symbols, or in microseconds) between the consequent symbols of the pilot sequence. According to the exemplary embodiments of this invention the pilot density does not have the requirement of being equal. On the contrary, if soft-reuse power patterns are in use, the pilot sequence density can differ between the high power and low power profiles. However, the inverse also holds so that regardless of power profiles, equal pilot density may still be applied. Further, if pilot density is equal in time, it need not be equal in frequency and vice versa. In an exemplary embodiment of the invention the pilot density is equal in time, but the frequency density may be either equal or non-equal depending on the soft-reuse application.

As employed herein, common pilots are sequences that are a-priori known by all receivers that are capable of operating in a specified wireless communication system. As such, any receiver at any time may search for the known pilot sequences and may detect them after a sufficient integration and processing time, if the signal quality of the sequence is sufficiently high. A wireless communication system typically has a defined set of such common pilot sequences available. For reliable estimation of the channel amplitudes, which is essential for demodulating higher order modulations such as 16-QAM and 64-QAM, the relative amplitudes of the pilot symbols that constitute the pilot sequences should be known to the receiver.

The system may further include dedicated pilot symbols, which are present in an allocation unit assigned for a defined receiver or for a defined set of receivers. These receivers, when decoding the payload, may exploit additional dedicated pilot symbol energy to enhance their channel estimation accuracy from what is obtainable from the common pilot sequence alone. Such dedicated pilots may have versatile patterns and they may be present only for those receivers that are in need of the benefit obtained from the dedicated pilot sequences. As frequency-time allocations for the receivers follow soft-reuse patterns, those patterns are readily available within the allocated resource unit for proper placement of the dedicated symbols as well.

It should be noted that in addition to channel estimation, the pilot sequences may be used for synchronization as well. For synchronization purposes it is important to acquire a sufficiently accurate frequency reference and time reference for sampling the signal and for tracking the variation of the frequency and time of the received signal. Such variations can be caused by the dynamics of the radio propagation environment, and is emphasized by the mobility of the receiver. The soft-reuse aspects of the exemplary embodiments of this invention are fully applicable to all such pilot sequences, whether they are used for channel estimation only or whether they are also used for synchronization.

In operation, the joint pilot and soft reuse arrangement represented by the exemplary embodiments of this invention employs signaling of a power offset between the pilots in the high power resources (possibly with more pilots) and the pilots in the low power resources (possibly with less pilots), and thus both the Node B 12 and the UE 10 participate in implementing the invention. As such, the embodiments of this invention may be implemented by computer software executable by the DP 10A of the UE 10 and by the DP 12A of the Node B 12, or by hardware, or by a combination of software and hardware.

In a first exemplary embodiment of the invention, the pilot density in the frequency domain is a constant. However, signaling of the power offset between the pilots in the high power and low power sub-bands is still used. In accordance with the first exemplary embodiment the power sub-bands are selected to fit into predetermined pilot densities.

In a second exemplary embodiment of the invention, the pilot density in the frequency domain is non-constant, so that the density in the higher power sub-bands is higher than in the lower power sub-bands. In addition to the overall benefits discussed above, arranging more pilot power/overhead into sub-bands with higher transmission power has an added benefit for channel estimation. That is, in a soft reuse scenario it is assumed that cell edge users are served by the part of the spectrum with higher power, whereas users close to the Node B 12 are served by the parts of the spectrum with lower transmission power. It is known that the RMS delay spread of users in a cell obeys a power law as a function of the distance from the base station (see L. J. Greenstein, V. Erceg, Y.-S. Yeh and M. V. Clark, "A new path-gain/delay-spread propagation model for digital cellular channels", IEEE T. Vehic. Tech., vol 46, no 2, pp. 477-485, May 1997).

This means that the further away a user is from the cell transmitter, the larger is the delay spread. This fact is directly reflected into the pilot arrangement in accordance with the exemplary embodiments of this invention. A larger delay spread means that the coherence bandwidth is narrower, and thus a higher pilot density in the frequency domain is needed. As the sub-bands with higher transmit power are intended for users that are further away, it is beneficial to have a higher pilot density in the frequency domain in these sub-bands.

Figure 2:
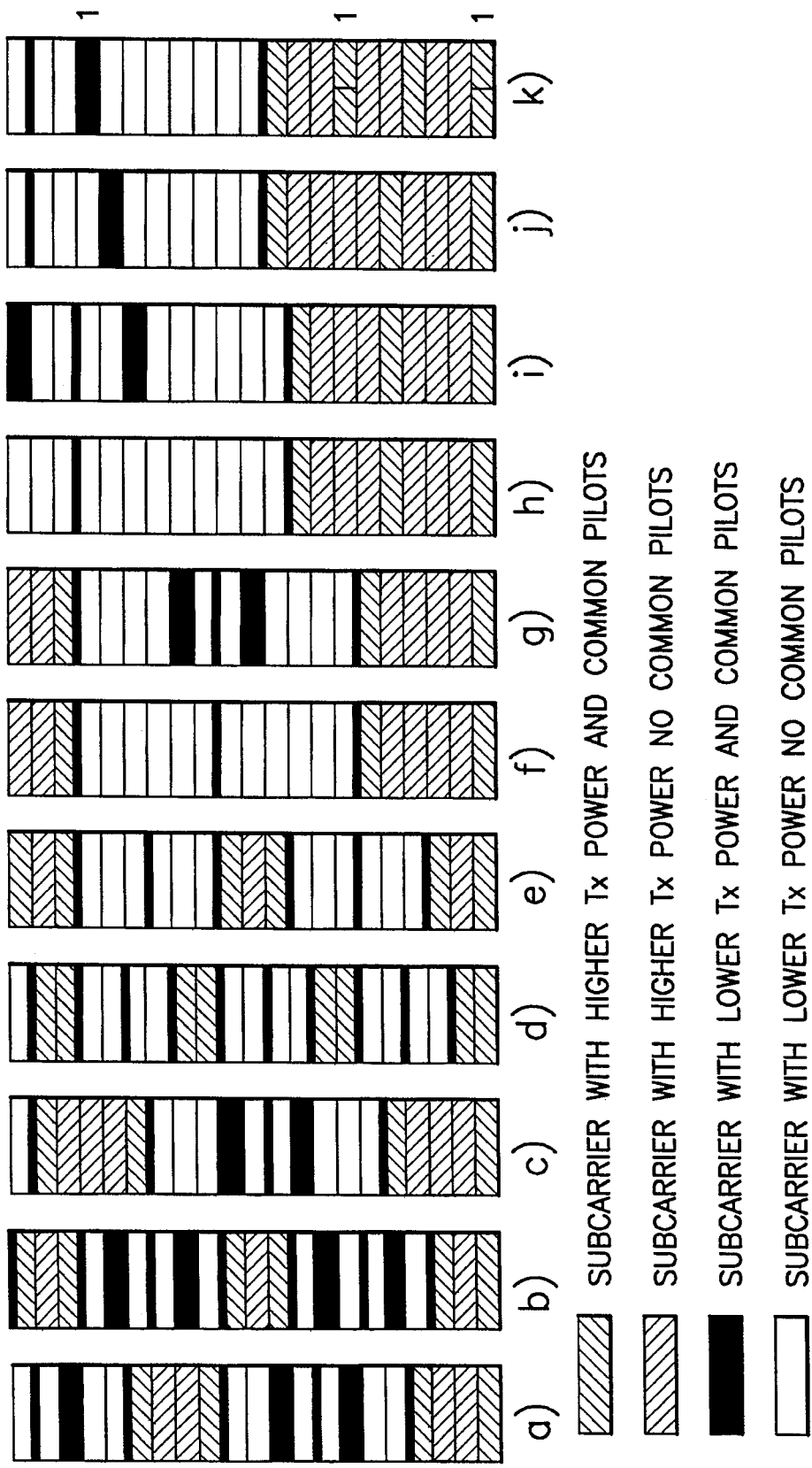
FIG. 2 depicts a number of pilot arrangements for soft reuse according to exemplary embodiments of the invention.

In FIG. 2 various pilot arrangements (a) through (k) are shown. Arrangements (a) and (b) are according to the first embodiment of the invention discussed above (i.e., pilot density in the frequency domain is a constant). Arrangements (c) through (k) are according to the second embodiment of the invention (i.e., non-constant pilot density in the frequency domain). The pilots may be provisioned to the indicated sub-carriers with any suitable method, such as by TDM, CDM, FDM and staggered methods, or their combinations.

Further in this regard, a TDM pilot is a pilot structure that includes symbols of the pilot sequence during one multi-carrier (OFDMA) symbol at a time. There are several symbols without any pilot sequence symbols between every two time domain symbols carrying pilot sequences. This arrangement may occur, e.g., once per every sub-frame, or twice per sub-frame. The TDM pilot often includes symbols of the pilot sequences on a sparse grid of sub-carriers, such that not all of the sub-carriers of the multi-carrier symbol carry the pilot. The pilot symbol density in frequency is sufficient to allow channel estimation of each coherence bandwidth with sufficient accuracy.

A FDM pilot is a pilot structure that includes symbols of the pilot sequence on certain sub-carriers only. These pilot sequences may be continuous in time, or non-continuous in time, but always include pilot symbols multiplexed in frequency with other information, such as data payload and/or signaling.

A CDM pilot is a pilot structure that includes pilot sequences spread by a pilot-specific spreading code such that every pilot symbol is multiplied by the spreading sequence prior to transmission. The pilot sequence is thus separated from possible data payload and signaling information since the data payload has its own spreading sequence, the signaling has its own spreading sequence, and the pilot symbols have their own, different spreading sequence. In this case the receiver, when correlating the received signal with the known sequence(s), may separate any of the signals from all the other signals and noise.

A staggered pilot is a pilot structure that includes symbols of the pilot sequence on several frequency sub-carriers of several time domain multi-carrier symbols. Staggering can be more dense in frequency, by allocating more sub-carriers to the pilot sequence, making it less dense in time (allocating symbols in time). Alternatively, staggering may be less dense in frequency, by allocating less sub-carriers, but more dense in the time domain. The pilot sequence density in frequency does not need to be equal for every time domain symbol occurrence. Staggering, however, always involves more than one frequency component and more than one time component in the pilot sequence.

As allocations to different receivers are typically time and frequency multiplexed, and the usage of a portion of a given resource largely depends on propagation conditions between the transmitter and the receiver, the pilot structure needs to guarantee sufficient pilot energy and pilot density in time and frequency for all receivers. If a given transmission applies a high order sub-carrier modulation such as 16QAM or 64QAM, the requirements for channel estimation are more stringent as compared to lower order BPSK or QPSK modulation.

In addition to the power offsets between pilots for soft frequency reuse there may be adjustable or standardized pilot-data offsets. This means that the pilot sub-carriers are transmitted with a higher (or lower) power than the data sub-carriers. Pilot-data power offsets that are adjustable on a cell-to-cell basis are understood to be valuable. Pilot-data power offsets may be utilized even in a dynamic fashion, changing on a transmission time interval to transmission time interval basis. Pilot-data power offsets generalize in a natural way to the pilot arrangements disclosed in accordance with the exemplary embodiments of this invention. There may be, for example, cell-specific pilot-data power offsets, so that the offset is always considered between the pilot transmission and the data transmission of the soft reuse sub-band that the pilot transmission belongs to. This may be generalized to having two different pilot-data offsets, one for the pilots and data in sub-bands with lower power, and one for the pilots and data in sub-bands with higher power. These pilot offsets may be signaled, or they may be left to be blindly detected by the receiver. In one exemplary and non-limiting embodiment, the same pilot-data offset is used in all resources allocated to one user irrespective of whether these resources are in a high-power or low-power soft reuse sub band. This solution would have the advantage that if this user-specific pilot-data power offset is not signaled, the UE needs to blindly estimate only one pilot-data power offset.

Pilots for multiple antennas 13 may similarly be multiplexed either by TDM, CDM, FDM. It is assumed that the distribution of pilot power on a sub-carrier may change from symbol to symbol. For example, in a TDM pilot arrangement according to an exemplary embodiment of this invention, one or more OFDM symbols in a radio frame may have pilots according to FIG. 2. In a CDM arrangement, multiple OFDM symbols may have pilots according to FIG. 2, so that on a sub-carrier with common pilots, the pilot channels are multiplexed with data (or other channels) in a code division manner.

The fraction of pilot sub-carriers to all sub-carriers, representing the overall pilot density, and the fraction of pilot sub-carriers in the high power sub-band to all pilot sub-carriers, for the arrangements (a) through (k) of FIG. 2 are reported in the Table shown in FIG. 3.

In the Table of FIG. 3, Soft Reuse ("SR") sub-band indicates the number of neighboring sub-carriers in a soft reuse sub-band, and "SR sub-band (kHz)" gives the width of a soft reuse sub-band, assuming a proposed 15 kHz sub-carrier separation of E-UTRAN. In all of these examples, the soft reuse factor is 3, meaning that ⅓ of the bandwidth exhibits higher transmission power that the remainder of the bandwidth. Channel estimation studies have shown that to guarantee good performance of E-UTRAN, it is preferable to have a pilot on at least every eighth sub-carrier, i.e., there may be 120 kHz between pilots (assuming the 15 kHz sub-carrier separation). In arrangement (i), the largest distance between pilots is seven sub-carriers.

It can be noted that if transmission involves more than one antenna 13, the pilot symbols are made sufficiently dense both in frequency and in time for all transmitting antennas. This has an impact on the soft-reuse patterns such that a high power pattern preferably includes pilot sequences of all transmitting antennas, while the low power profiles include pilot sequences of at least the associated transmitting antennas.

Further in this regard, in the exemplary arrangements (a) and (b) of FIG. 2 the foregoing is literally true. Consider then, for example, arrangement (k), where pilots are transmitted on six out of 30 sub-carriers, i.e., the pilot density is ⅕. However, for channel estimation purposes, a pilot density of ½-⅛ is typically seen as sufficient. Now we have a density 1/11 in a worst case if one considers arrangement (k) with a two-antenna TDM common pilot (between the two upper "1"s there are 10 sub-carriers without a pilot from antenna 1. As was noted above, the low power sub-bands are intended for those users closer to the base station 12, thus their required pilot density is not as high as the required pilot density of the cell edge users.

Resources in E-UTRAN may be allocated either in the time domain or in the frequency domain. It has been proposed that the granularity of the frequency domain may be in blocks of 20-50 sub-carriers (300-750 kHz). In another exemplary and non-limiting embodiment, the granularity of the frequency domain may be in blocks of 36-80 sub-carriers. One particularly reasonable granularity is 25 sub-carriers, which fits exactly into all identified frequency bandwidths described in the 3GPP TR 25.814. If parameters of the system differ from those described in 3GPP TR 25.814, the exemplary embodiments of this invention can be exploited by making respective numerical changes. For example, in an exemplary and non-limiting embodiment of the invention, 12 sub-carriers can be employed. The proposed granularity is seen as being sufficient to obtain most of the gains from, for example, frequency domain scheduling and possible feedback-heavy beamforming methods.

The different SR sub-bands with different allowed power preferably belong to separately allocatable resource units. To keep the number of independently allocatable resource units at a relatively small and manageable value, multiple SR sub-bands may be allocated together. Thus, and using as examples the arrangements (j) and (k), two SR sub-bands may be allocated together, and the bandwidth that one allocatable resource is distributed over would be 600 kHz. In this case the used bandwidth of each allocatable resource would be 300 kHz, thereby implying that there would be 15 allocatable frequency resources in a 5 MHz E-UTRAN system band with 300 sub-carriers.

Alternatively, the allocatable resource units may be smaller, at the cost of more control channel signaling. In this case the natural resource unit in example (k) could be 10 sub-carriers that span 150 kHz, and there would be 30 allocatable frequency resources in a 5 MHz E-UTRAN system band.

Two Tx antennas 13 may be the typical mode of operation for E-UTRAN. Example (k) of FIG. 2 is particularly well suited to accommodate pilots for two Tx antennas. When dividing pilot sub-carriers in one symbol among multiple antennas, FDM is beneficial as compared to CDM, as in FDM the number of filter taps in a channel estimation filter is smaller. In example (k), in symbols with pilots, the pilot sub-carriers indicated by "1" may have a pilot transmission from antenna 1, and the remaining pilots from antenna 2.

The exemplary arrangement (k) is a particularly useful embodiment of the invention from the E-UTRAN point of view. The advantages of arrangement (k) include the following:

more pilots may be transmitted on high power soft reuse sub-bands;
higher density of pilots on high power soft reuse sub-bands;

sufficiently wide soft reuse sub-bands, with a width that fits well into the sets of active sub-carriers envisioned for the various system-bandwidths of E-UTRAN;
soft-reuse sub-bands become sufficiently narrow so that the high power regime may be split into multiple sub-bands, thereby overcoming a lack-of frequency diversity problem of frequency domain soft reuse; and
an amenability to frequency multiplexing of pilot signals from two Tx antennas 13.

Contrasting arrangements (j) and (k), it can be noted that in both (j) and (k) there are an equal number of sub-carriers with higher power; i.e., 10 sub-carriers are transmitted with higher power. In arrangement (k), however, there are four pilots in this high power regime. This fact would facilitate designing with two Tx antenna pilots, as TDM may be used. In arrangement (j), however, if two Tx antennas were used then the common pilots would need to utilize CDM as opposed to TDM. At least for this reason the arrangement (k) is preferred to arrangement (j).

Figure 4A:
FIG. 4A illustrates an exemplary soft reuse 3 network arrangement, having the same carrier frequency in use in every cell of the network, where
Figure 4A:
Figure 4A:
Figure 4A:
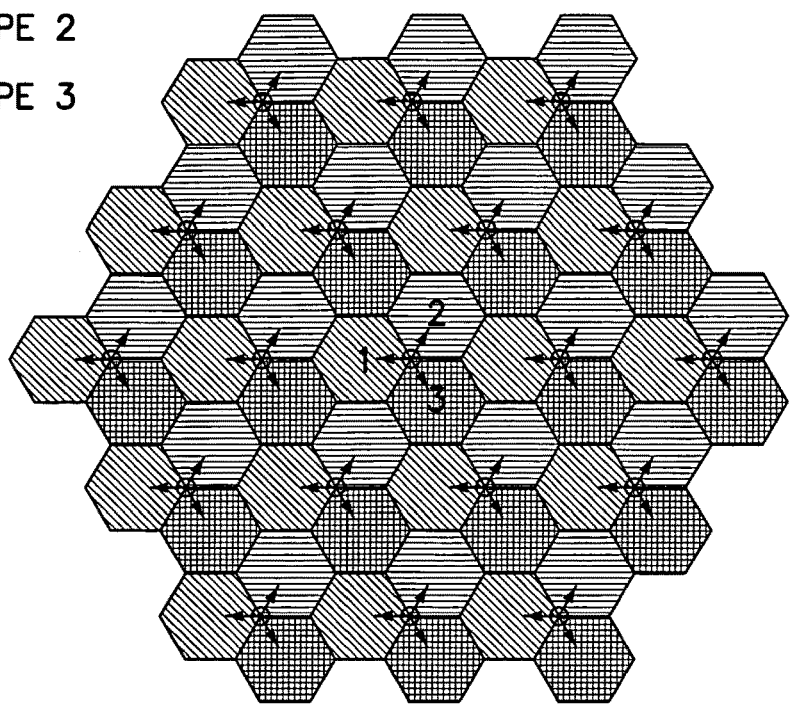
Figure 4B:
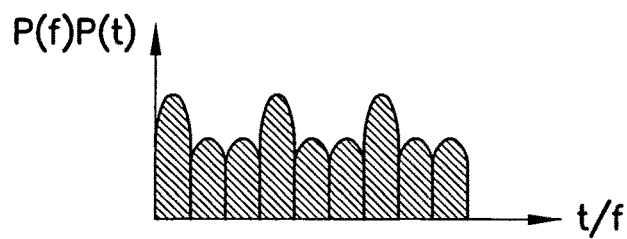
FIGS. 4B-4D show the use of different exemplary power masks in at least one of the time and frequency domains in the different cell types of FIG. 4A using two different power levels.
Figure 4B:
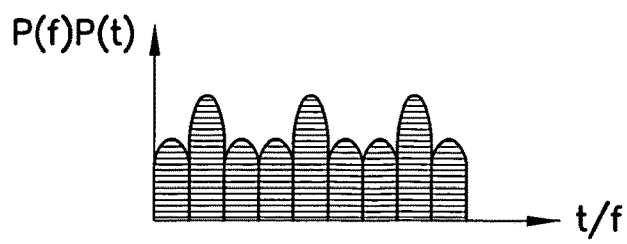
Figure 4B:
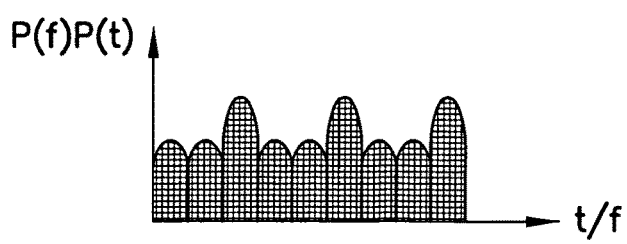
Figure 4C:
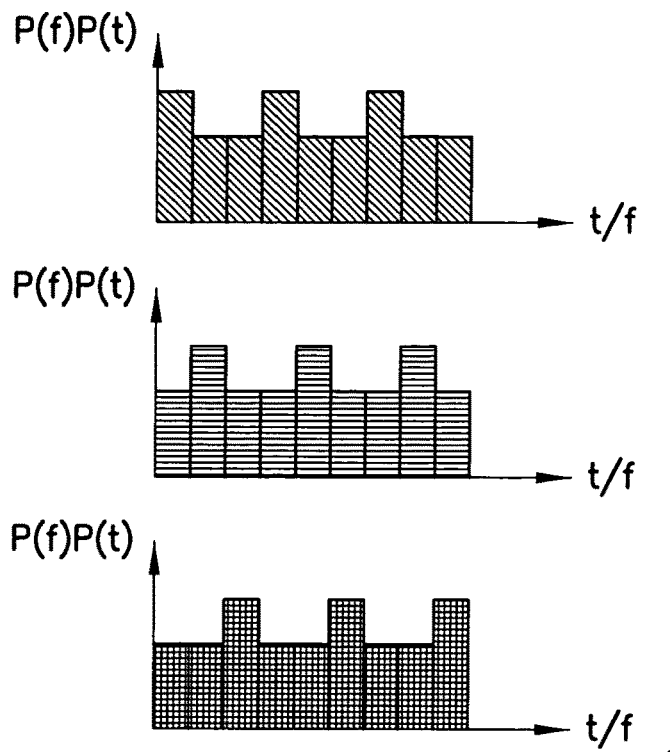
Figure 4D:
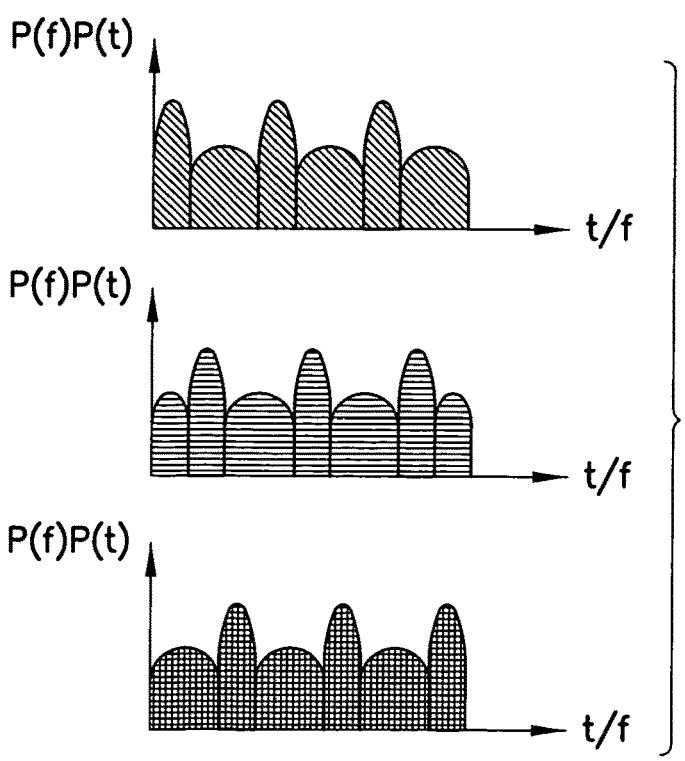

The soft-reuse pattern may be assumed to be a network planning parameter, such that once a network is deployed, a given soft-reuse pattern is designed. This design can include an assignment of frequency patterns per power profiles. One suitable method is to distribute the system bandwidth to defined portions of the frequency spectrum and assign each of these defined portions a power profile. Reference in this regard can be made to FIGS. 4A-4D, where FIG. 4A illustrates an exemplary soft-reuse 3 network arrangement, while FIGS. 4B-4D show the use of different exemplary power masks in the time/frequency domain in the different cell types of FIG. 4A using two different power levels.

The selected soft-reuse pattern design may be written to the standard specifications so that the frequency portions are constant, say f1/f, f2/f and f3/f, where f is the system bandwidth, and where the power profiles are constant, say f1 applies to power 0 dB, f2 applies to power −4 dB relative to f1, and f3 applies to power −4 dB relative to f1. While it is understood that even though the selected soft-reuse pattern design can be expressed in a standard specification, it is a network planning issue to design the permutations, e.g., how f1, f2 and f3 locate in frequency in each cell. In geographically adjacent cells f1, f2 and f3 need to be permuted in order to provide the highest (inter-cell) interference mitigation gains.

A second method defines the frequency proportions to the standard specifications, and allows the power profile value to be network specific. For example, the minimum width of an allocatable resource may be defined in the standard specification, which would implicitly define the minimum bandwidth that can be used for soft-resuse patterns. This permits, in certain topologies, that the power profiles can have values 0 dB, 0 dB, 0 dB, meaning that all sub-carriers are transmitted with the same power, whereas in other topologies they have different values, e.g., 0 dB, −4 dB, −4 dB. It is important for the receiver to know if such power profiles are applied for the pilot sequences, and thus the above-referenced signaling can be employed for this purpose.

The power profile-related signaling may be placed in commonly accessible System Information, which any receiver in the system is required to decode when attempting access to the network. In this case, and from at least one Information Element of the System Information, the receiver may directly gain knowledge of the system-specific assignment of soft-reuse power profiles per frequency.

An advantage of the use of the exemplary embodiments of this invention is that channel estimation performance is improved, as common pilots can exhibit higher transmission power. Also, those users that are allocated to the higher power transmission sub-bands, that are likely to be at cell edges and be experiencing hard interference conditions, automatically enjoy higher pilot power and possibly a higher pilot density in their respective sub-bands. Also, channel estimates that are constructed by filtering multiple pilot symbols in the frequency domain benefit significantly from knowing the offset between the pilot powers.

Figure 5:
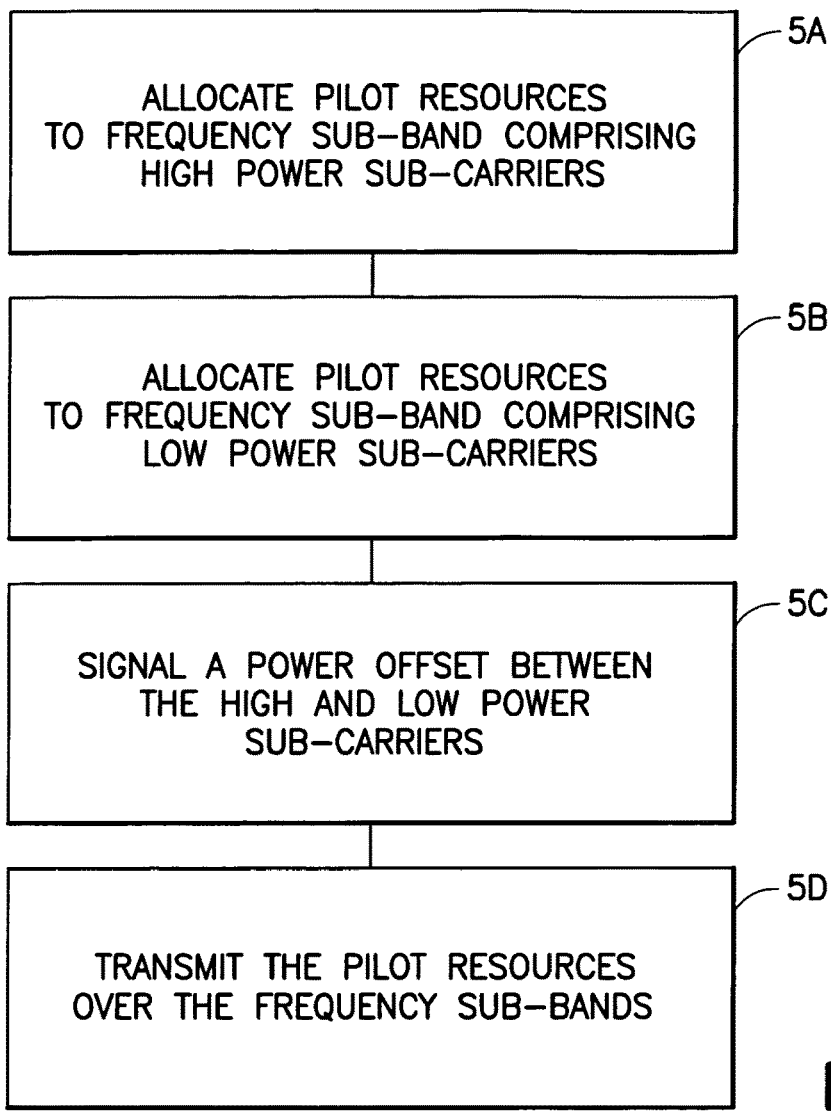
FIG. 5 is a flow diagram of a method according to an exemplary embodiment of the invention.

With reference to FIG. 5, there is illustrated a flow chart of a method according to an exemplary embodiment of the invention. At step 5A, pilot resources are allocated to first frequency sub-band. As described above, the first frequency sub-band is formed of a plurality of contiguous high power sub-carriers. At step 5B, pilot resources are allocated to second frequency sub-band formed of a plurality of contiguous low power sub-carriers. At step 5C, the power offset between the pilots in the high and low power sub-carriers is signaled, such as to user equipment 10 receiving transmissions from a network element, such as a base station 12. At step 5D, the pilot resources are transmitted over the frequency sub-bands.

Figure 6:
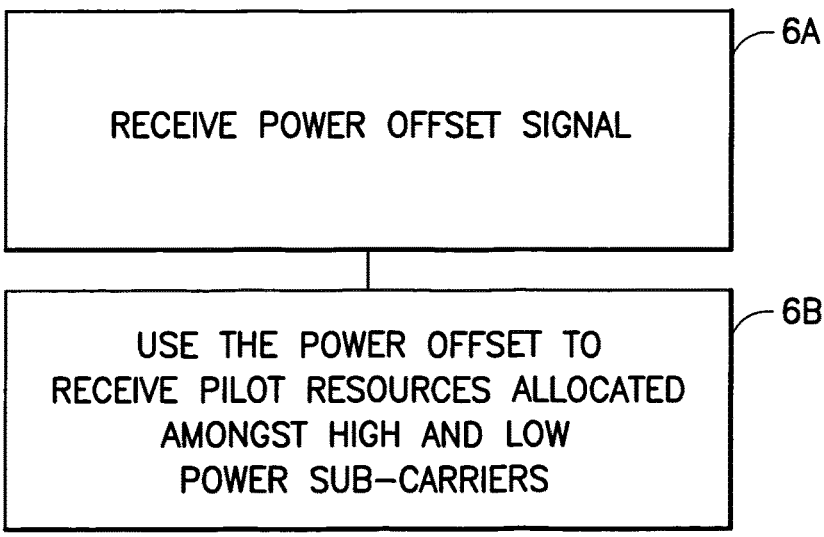
FIG. 6 is a flow diagram of another method according to an exemplary embodiment of the invention.

With reference to FIG. 6, there is illustrated a flow chart of a method of receiving according to an exemplary embodiment of the invention. At step 6A, a power offset between pilots in the high and low power sub-carriers is received, such as by a user equipment 10. At step 6B, the power offset is utilized to receive pilot resources allocated amongst the high and low power sub-carriers.

In general, the various embodiments may be implemented in hardware or special purpose circuits, software, logic, Application Specific Integrated Circuits (ASICs) or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   allocating, by an apparatus, a first plurality of pilot resources to a first frequency sub-band comprising a plurality of first sub-carriers allocated to users on higher power sub-bands;
   allocating, by the apparatus, a second plurality of pilot resources to a second frequency sub-band comprising a plurality of second sub-carriers allocated to users on lower power sub-bands;
   generating, by the apparatus, a first signal comprising a first pilot-data power offset between said first plurality of pilot resources and said plurality of first sub-carriers allocated to users on higher power sub-bands, wherein the first pilot-data power offset is a differing power of pilot transmission on said first plurality of pilot resources and data transmission on said plurality of first sub-carriers;
   generating, by the apparatus, a second signal comprising a second pilot-data power offset between said second plurality of pilot resources and said plurality of second sub-carriers allocated to users on lower power sub-bands, wherein the second pilot-data power offset is a differing power of pilot transmission on said second plurality of pilot resources and data transmission on said plurality of second sub-carriers; and
   wirelessly transmitting said first and/or second signals;
   where a pilot resource pattern, common to the users on the higher power sub-bands and the users on the lower power sub-bands, remains unchanged.

2. The method of claim 1, wherein a first density of said first plurality of pilot resources in said first frequency sub-band is different from a second density of said second plurality of pilot resources in said second frequency sub-band and wherein said first density is greater than said second density.

3. The method of claim 1, wherein a density of said first plurality of pilot resources and said second plurality of pilot resources is constant in at least one of a time domain or a frequency domain.

4. The method of claim 1, wherein said first plurality of pilot resources and said second plurality of pilot resources comprise a common pilot sequence.

5. The method of claim 1, further comprising: provisioning said first and said second plurality of pilot resources into said first and said second frequency sub-bands utilizing at least one of a Time Division Multiplex (TDM), a Code Division Multiplex (CDM), a Frequency Division Multiplex (FDM), or a staggered method.

6. The method of claim 1, wherein at least one pilot resource is allocated on at least every eighth sub-carrier.

7. The method of claim 1, wherein the apparatus comprises a device in an evolved universal terrestrial radio access network.

8. A memory storing a program of machine-readable instructions, execution of the program by a processor resulting in actions comprising:

allocating a first plurality of pilot resources to a first frequency sub-band comprising a plurality of first sub-carriers allocated to users on higher power sub-bands;

allocating a second plurality of pilot resources to a second frequency sub-band comprising a plurality of second sub-carriers allocated to users on lower power sub-bands;

generating a first signal comprising a first pilot-data power offset between said first plurality of pilot resources and said plurality of first sub-carriers allocated to users on higher power sub-bands, wherein the first pilot-data power offset is a differing power of pilot transmission on said first plurality of pilot resources and data transmission on said plurality of first sub-carriers;

generating a second signal comprising a second pilot-data power offset between said second plurality of pilot resources and said plurality of second sub-carriers allocated to users on lower power sub-bands, wherein the second pilot-data power offset is a differing power of pilot transmission on said second plurality of pilot resources and data transmission on said plurality of second sub-carriers; and wirelessly transmitting said first and/or second signals;

where a pilot resource pattern, common to the users on the higher power sub-bands and the users on the lower power sub-bands, remains unchanged.

9. The memory of claim 8, wherein a first density of said first plurality of pilot resources in said first frequency sub-band is different from a second density of said second plurality of pilot resources in said second frequency sub-band and wherein said first density is greater than said second density.

10. The memory of claim 8, wherein a density of said first plurality of pilot resources and said second plurality of pilot resources is constant in at least one of a time or a frequency domain.

11. The memory of claim 8, wherein the memory is embodied in an apparatus that comprises a device in an evolved universal terrestrial radio access network.

12. An apparatus comprising:

a processor; and a memory storing program instructions, where the memory and the program instructions are configured to, with the processor, cause the apparatus to:

allocate a first plurality of pilot resources to a first frequency sub-band comprising a plurality of first sub-carriers allocated to users on higher power sub-bands;

allocate a second plurality of pilot resources to a second frequency sub-band comprising a plurality of second sub-carriers allocated to users on lower power sub-bands;

generate a first signal comprising a first pilot-data power offset between said first plurality of pilot resources and said plurality of first sub-carriers allocated to users on higher power sub-bands, wherein the first pilot-data power offset is a differing power of pilot transmission on said first plurality of pilot resources and data transmission on said plurality of first sub-carriers;

generate a second signal comprising a second pilot-data power offset between said second plurality of pilot resources and said plurality of second sub-carriers allocated to users on lower power sub-bands, wherein the second pilot-data power offset is a differing power of pilot transmission on said second plurality of pilot resources and data transmission on said plurality of second sub-carriers; and wirelessly transmit said first and/or second signals;

where a pilot resource pattern, common to the users on the higher power sub-bands and the users on the lower power sub-bands, remains unchanged.

13. The apparatus of claim 12, wherein a first density of said first plurality of pilot resources in said first frequency sub-band is different from a second density of said second plurality of pilot resources in said second frequency sub-band and wherein said first density is greater than said second density.

14. The apparatus of claim 12, wherein the apparatus comprises a device in an evolved universal terrestrial radio access network.

15. The apparatus of claim 12, wherein said first plurality of pilot resources and said second plurality of pilot resources comprise a common pilot sequence.

16. An apparatus comprising a processor; and a memory storing program instructions, where the memory and the program instructions are configured to, with the processor, cause the apparatus to:

receive via a wireless receiver a first pilot-data power offset between a first plurality of pilot resources and a plurality of first sub-carriers allocated to users on higher power sub-bands and a second pilot-data power offset between a second plurality of pilot resources and a plurality of second sub-carriers allocated to users on lower power sub-bands, wherein a first frequency sub-band comprises said first plurality of pilot resources and said plurality of first sub-carriers allocated to users on higher power sub-bands, wherein a second frequency sub-band comprises said second plurality of pilot resources and said plurality of second sub carriers allocated to users on lower power sub-bands, wherein the first pilot-data power offset is a differing power of pilot transmission on said first plurality of pilot resources and data transmission on said plurality of first sub-carriers, wherein the second pilot-data power offset is a differing power of pilot transmission on said second plurality of pilot resources and data transmission on said plurality of second sub-carriers; and depending upon whether the apparatus is or is associated with a user on the higher power sub-bands or on the lower power sub-bands, at least one of: wirelessly receive a signal on said first plurality of pilot resources related to said first pilot-data power offset or wirelessly receive a signal on said second plurality of pilot resources related to said second pilot-data power offset, where a pilot resource pattern, common to the users on the higher power sub-bands and the users on the lower power sub-bands, remains unchanged.

17. The apparatus of claim 16, wherein a first density of said first plurality of pilot resources in said first frequency sub-band is different from a second density of said second plurality of pilot resources in said second frequency sub-band and wherein said first density is greater than said second density.

18. The apparatus of claim 16, wherein a pilot density of said first and said second plurality of pilot resources across said first and said second frequency sub-bands is between approximately $\frac{1}{2}$ and $\frac{1}{10}$.

19. The apparatus of claim 16, wherein a density of said first plurality of pilot resources and said second plurality of pilot resources is constant in at least one of a time domain or a frequency domain.

20. The apparatus of claim 16, wherein said first plurality of pilot resources and said second plurality of pilot resources comprise a common pilot sequence.

21. The apparatus of claim 16, wherein the apparatus comprises a device in an evolved universal terrestrial radio access network.

22. An integrated circuit comprising:
first allocation circuitry operable to allocate a first plurality of pilot resources to a first frequency sub-band comprising a plurality of first sub-carriers allocated to users on higher power sub-bands and to allocate a second plurality of pilot resources to a second frequency sub-band comprising a plurality of second sub-carriers allocated to users on lower power sub-bands;
second generation circuitry operable to generate a first signal comprising a first pilot-data power offset between said first plurality of pilot resources and said plurality of first sub-carriers allocated to users on higher power sub-bands and a second signal comprising a second pilot-data power offset between said second plurality of pilot resources and said plurality of second sub-carriers allocated to users on lower power sub-bands, where the first pilot-data power offset is a differing power of pilot transmission on said first plurality of pilot resources and data transmission on said plurality of first sub-carriers and the second pilot-data power offset is a differing power of pilot transmission on said second plurality of pilot resources and data transmission on said plurality of second sub-carriers, and where a pilot resource pattern, common to the users on the higher power sub-bands and the users on the lower power sub-bands, remains unchanged; and
a transmitter configured to wirelessly transmit said first and/or second signals.

23. An integrated circuit comprising:
first reception circuitry operable to wirelessly receive a first pilot-data power offset between a first plurality of pilot resources and a plurality of first sub-carriers allocated to users on higher power sub-bands and to wirelessly receive a second pilot-data power offset between a second plurality of pilot resources and a plurality of second sub-carriers allocated to users on lower power sub-bands,
wherein a first frequency sub-band comprises said first plurality of pilot resources and said plurality of first sub-carriers allocated to users on higher power sub-bands,
wherein a second frequency sub-band comprises said second plurality of pilot resources and said plurality of second sub-carriers allocated to users on lower power sub-bands,
wherein the first pilot-data power offset is a differing power of pilot transmission on said first plurality of pilot resources and data transmission on said plurality of first sub-carriers, and
wherein the second pilot-data power offset is a differing power of pilot transmission on said second plurality of pilot resources and data transmission on said plurality of second sub-carriers; and
second usage circuitry operable to, depending upon whether the integrated circuit comprises part of a user device associated with the higher power sub-bands or associated with the lower power sub-bands, receive a signal on at least one of said first plurality of pilot resources related to said first pilot-data power offset or receive a signal on said second plurality of pilot resources related to said second pilot-data power offset related to said second pilot-data power offset, where a pilot resource pattern, common to the users on the higher power sub-bands and the users on the lower power sub-bands, remains unchanged.

24. An apparatus comprising:
means for allocating a first plurality of pilot resources to a first frequency sub-band comprising a plurality of first sub-carriers allocated to users on higher power sub-bands;
means for allocating a second plurality of pilot resources to a second frequency sub-band comprising a plurality of second sub-carriers allocated to users on lower power sub-bands;
means for generating a first signal comprising a first pilot-data power offset between said first plurality of pilot resources and said plurality of first sub-carriers allocated to users on higher power sub-bands, wherein the first pilot-data power offset is a differing power of pilot transmission on said first plurality of pilot resources and data transmission on said plurality of first sub-carriers;
means for generating a second signal comprising a second pilot-data power offset between said second plurality of pilot resources and said plurality of second sub-carriers allocated to users on lower power sub-bands, wherein the second pilot-data power offset is a differing power of pilot transmission on said second plurality of pilot resources and data transmission on said plurality of second sub-carriers; and
means for wirelessly transmitting said first and/or second signals;
where a pilot resource pattern, common to the users on the higher power sub-bands and the users on the lower power sub-bands, remains unchanged.

25. The apparatus of claim 24, wherein a first density of said first plurality of pilot resources in said first frequency sub-band is different from a second density of said second plurality of pilot resources in said second frequency sub-band and wherein said first density is greater than said second density.

26. The apparatus of claim 24, embodied at least partially in an integrated circuit.

27. The integrated circuit of claim 22, wherein a density of said first plurality of pilot resources and said second plurality of pilot resources is constant in at least one of a time domain or a frequency domain.

28. The integrated circuit of claim 22, wherein a first density of said first plurality of pilot resources in said first frequency sub-band is different from a second density of said second plurality of pilot resources in said second frequency sub-band and wherein said first density is greater than said second density.

29. The integrated circuit of claim 23, wherein a density of said first plurality of pilot resources and said second plurality of pilot resources is constant in at least one of a time domain or a frequency domain.

30. The integrated circuit of claim 23, wherein a first density of said first plurality of pilot resources in said first frequency sub-band is different from a second density of said second plurality of pilot resources in said second frequency sub-band and wherein said first density is greater than said second density.

31. A method comprising:
wirelessly receiving a first pilot-data power offset between a first plurality of pilot resources and a plurality of first sub-carriers allocated to users on higher power sub-bands and a second pilot-data power offset between a second plurality of pilot resources and a plurality of second sub-carriers allocated to users on lower power sub-bands,
  wherein a first frequency sub-band comprises said first plurality of pilot resources and said plurality of first sub-carriers allocated to users on higher power sub-bands,
  wherein a second frequency sub-band comprises said second plurality of pilot resources and said plurality of second sub-carriers allocated to users on lower power sub-bands,
  wherein the first pilot-data power offset is a differing power of pilot transmission on said first plurality of pilot resources and data transmission on said plurality of first sub-carriers, and
  wherein the second pilot-data power offset is a differing power of pilot transmission on said second plurality of pilot resources and data transmission on said plurality of second sub-carriers; and
depending upon whether the method is performed in a device being or associated with a user on the higher power sub-bands or is performed in a device being or associated with a user on the lower power sub-bands, at least one of receiving a signal on said first plurality of pilot resources related to said first pilot-data power offset or receiving a signal on said second plurality of pilot resources related to said second pilot-data power offset,
where a pilot resource pattern, common to the users on the higher power sub-bands and the users on the lower power sub-bands, remains unchanged.

32. The method of claim 31, wherein a density of said first plurality of pilot resources and said second plurality of pilot resources is constant in at least one of a time domain or a frequency domain.

33. The method of claim 31, wherein a first density of said first plurality of pilot resources in said first frequency sub-band is different from a second density of said second plurality of pilot resources in said second frequency sub-band and wherein said first density is greater than said second density.

34. The method of claim 31, wherein a pilot density of said first and said second plurality of pilot resources across said first and said second frequency sub-bands is between approximately ½ and ⅒.

35. The method of claim 31, wherein said first plurality of pilot resources and said second plurality of pilot resources comprise a common pilot sequence.

36. A memory storing a program of machine-readable instructions, execution of the program by a processor resulting in actions comprising:
receiving via wireless receiver a first pilot-data power offset between a first plurality of pilot resources and a plurality of first sub-carriers allocated to users on higher power sub-bands and a second pilot-data power offset between a second plurality of pilot resources and a plurality of second sub-carriers allocated to users on lower power sub-bands,
  wherein a first frequency sub-band comprises said first plurality of pilot resources and said plurality of first sub-carriers allocated to users on higher power sub-bands,
  wherein a second frequency sub-band comprises said second plurality of pilot resources and said plurality of second sub-carriers allocated to users on lower power sub-bands,
  wherein the first pilot-data power offset is a differing power of pilot transmission on said first plurality of pilot resources and data transmission on said plurality of first sub-carriers, and
  wherein the second pilot-data power offset is a differing power of pilot transmission on said second plurality of pilot resources and data transmission on said plurality of second sub-carrier; and
depending upon whether the memory comprises part of an apparatus associated with a user on the higher power sub-bands or comprises part of an apparatus associated with a user on the lower power sub-bands, at least one of receiving a signal on said first plurality of pilot resources related to said first pilot-data power offset or receiving a signal on said second plurality of pilot resources related to said second pilot-data power offset,
where a pilot resource pattern, common to the users on the higher power sub-bands and the users on the lower power sub-bands, remains unchanged.

37. The memory of claim 36, wherein a density of said first plurality of pilot resources and said second plurality of pilot resources is constant in at least one of a time domain or a frequency domain.

38. The memory of claim 36, wherein a first density of said first plurality of pilot resources in said first frequency sub-band is different from a second density of said second plurality of pilot resources in said second frequency sub-band and wherein said first density is greater than said second density.

39. The memory of claim 36, wherein a pilot density of said first and said second plurality of pilot resources across said first and said second frequency sub-bands is between approximately ½ and ⅒.

40. The memory of claim 36, wherein said first plurality of pilot resources and said second plurality of pilot resources comprise a common pilot sequence.

* * * * *